3,401,038
DIAZOTYPE MATERIALS CONTAINING POLYCYCLIC LIGHT-SENSITIVE FLUORENE DIAZONIUM SALTS
Theodore Panasik, Vestal, N.Y., and Robert J. Cox, Los Gatos, Calif., assignors to GAF Corporation, a corporation of Delaware
No Drawing. Continuation-in-part of application Ser. No. 350,071, Mar. 6, 1964. This application Feb. 19, 1965, Ser. No. 434,101
6 Claims. (Cl. 96—91)

ABSTRACT OF THE DISCLOSURE

Light-sensitive diazotype material sensitized with a diazotized -secondary- or 7-tertiary-amino-2-primary aminofluorene.

---

This application is a continuation-in-part of our application Ser. No. 350,071, now abandoned, filed Mar. 6, 1964.

This invention relates to diazotype materials containing polycyclic diazonium salts having increased sensitivity to visible light. More particularly, this invention relates to diazotype materials containing diazonium salts of 7-substituted amino-2-primary amino fluorene compounds having increased sensitivity to visible light.

The useful light-sensitivity of p-aminobenzenediazonium salts of the formula

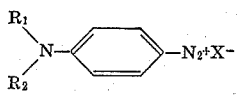

where $R_1$ and $R_2$ are hydrogen, alkyl, aryl, substituted alkyl or aryl, or together with the nitrogen form a heterocyclic moiety such as morpholino or piperidino, and X is an anion, is considered to be due to the contriibution made by the substituted amino group to resonance systems such as

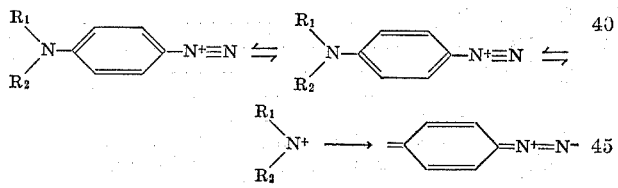

This resonance has the effect of decreasing the normal frequency of vibration of the molecule, causing it to absorb light of longer wave length which is more practical to generate and handle in commercially feasible equipment. This absorbed energy then causes breakdown of the diazo group with release of nitrogen and loss of ability to form azo dyes by coupling.

However, the region of maximum light absorption of these p-amino-benzenediazonium salts is for the most part 350–400 mμ, still in the near ultraviolet. Sensitivity of the compounds to more available light of still longer wave length might be increased by intensifying the bathochromic or "red shift" caused by resonance. A possible method of achieving this is to increase the length of the resonating path, for example, as follows:

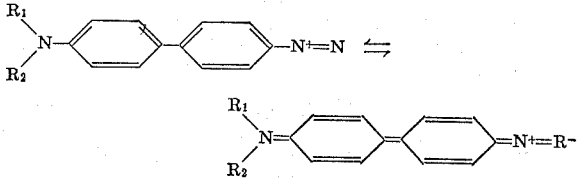

Unfortunately such simple biphenyl systems have so far failed to give useful products.

We have ascertained that by using a methylene (—CH₂—) group as a bridging member, polynuclear diazonium salts are produced which under suitable conditions of pH exhibit maximum absorptivity in the visible region of the spectrum. As a matter of fact some salts were produced which had a maximum absorption at the high wave length of 515 mμ. This property which makes the salts purplish in color, giving to them high sensitivity to visible light, provides utility in fields until now practically foreclosed to the diazotype system, such as, for example, enlargement of originals. Other important characteristics exhibited by this new class of diazotype sensitizers are a closer approximation to a orthochromatic response to the visible light of the spectrum, a much softer gradation than possible with the usual diazos derived from p-phenylenediamines and good resistance to wet bleeding of the dye images.

These polycyclic diazonium salts utilizable in our invention are the diazonium salts of amine selected from the group consisting of 7-tertiary-amino-2-primary-aminofluorene and 7-secondary amino compounds. These compounds are useful sensitizers in diazotype materials of both the 1- and 2- component types.

Typical diazonium salts of 7-substituted amino-2-primary-amino-fluorene compounds having no other groups on the fluorene ring useful in our invention can be represented by the following general formulae:

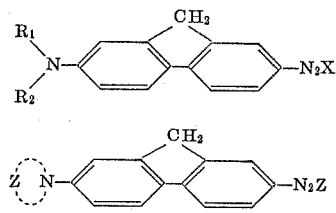

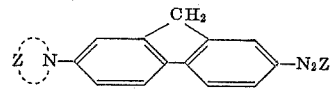

wherein $R_1$ is hydrogen; alkyl, i.e., methyl, ethyl, propyl, butyl, amyl, or the like; hydroxyalkyl, i.e., hydroxyethyl, hydroxypropyl, hydroxybutyl, or the like; aryl of the benzene series, i.e., phenyl tolyl, or the like; aralkyl, such as benzyl phenethyl, or the like; $R_2$ is alkyl, i.e. methyl, ethyl, propyl, butyl, amyl, or the like; hydroxyalkyl, i.e., hydroxyethyl, hydroxypropyl, hydroxybutyl, or the like; aryl of the benzene series, i.e., phenyl, tolyl, or the like; aralkyl, such as benzyl, phenethyl, or the like; Z represents the atoms necessary to complete a 6-membered heterocyclic ring, i.e., morpholino, piperidino, piperazino, thiomorpholino, etc. and X is an anion, such as halogen, i.e., chlorine, bromine, or the like; sulfate, fluoroborate and double salts with zinc chloride, cadmium chloride, tin chloride, and the like.

The fluorene nucleus of the structures represented above can of course contain various innocuous substituents on either of the aromatic rings, i.e., in the 1, 3, 4, 5, 6 or 8 position of the fluorene nucleus. Typical substituents of this type include alkoxy groups such as methoxy, ethoxy, propoxy, n-butoxy, tert-butoxy, octadecyloxy, etc.; alkyl groups such as methyl, ethyl, propyl, tertiary butyl, 2-ethylhexyl, octadecyl, etc.; halogen such as chloro, bromo, fluoro,etc.; acyloxy groups such as acetoxy, propionoxy, etc. and the like.

Examples of such compounds are 7-dimethylamino-2-fluorenediazonium tetrachlorozincate; 7-diethylamino-2-fluorenediazonium chlorozincate; 7-dipropylamino-2-fluorenediazonium chlorozincate; 7-amino-N-2-hydroxyethyl-N-methyl-2-fluoroenediazonium chlorozincate; 7-bis(2-hydroxyethyl)amino-2-fluorenediazonium chlorozincate; 7-dibutylamino-2-fluorenediazonium chlorozincate; 7-benzylamino-2-fluorenediazonium chlorozincate; 7-anilino-2-fluorenediazonium chlorozincate; 7-morpholino-2-fluorenediazonium chlorozincate; 7 - dimethylamino-3-methoxy-2-fluorenediazonium chlorozincate; 7-diethylamino-4,5-dibutoxy-2-fluorenediazonium chlorozincate; 7-dipropylamino-3-methyl - 2 - fluorenediazonium chlorozincate; 7-morpholino-3-tertiary-butoxy-2 - fluorenediazonium chlorozincate; 7-benzylamino-2-fluorenediazonium chlorozincate, and the like.

The compounds may be prepared by reacting 7-nitro-2-bromo-fluoren with the desired amine, i.e., morpholine, dimethylamine, diethylamine, ethanolamine, benzylamine, aniline, or the like, catalytically, reducing the resulting 7-nitro-N-substituted fluoren-2-amine, to 7 - amino-N-substituted fluoren-2-amine and diazotizing this primary amine.

Typically N,N-dimethylfluorene-2,7-diamine (J. Org. Chem. 23, 680 (1957)) was prepared by the catalytic reduction of N,N-dimethyl-7-nitro-fluoren-2-amine (J. Org. Chem. 27, 3643 (1962)).

7 - dimethylamino-2-fluorenediazonium chlorozincate was prepared by dissolving 10 grams of N,N-dimethylfluorene-2,7-diamine in 167 ml. of dilute HCl 1:1. The solution was treated with Norit decolorizing carbon, filtered, and the filtrate was cooled in an ice bath. To the stirred solution at 0–5° C., 7.4 ml. of sodium nitrite 5 M was added dropwise. The solution was stirred for 15 minutes at 5–10° C. and treated with 13.4 ml. of zinc chloride solution (66–67%). The resulting mixture was stirred for 1 hour and the precipitate was then filtered, slurried with acetone, refiltered, and dried under reduced pressure.

The diazonium compounds can be used in one-component diazotype material in which case development is brought about by passing the exposed diazotype material through a moist alkaline bath containing the coupling component. They may also be employed in two-component diazotype material in which development is brought about, after exposure, by treatment with ammonia.

Any of the couplers normally employed in the manufacture of processing of diazotype materials may be used and, in this connection, reference is made to 2,3-naphthalenediol; 2-naphthol-3,6-disulfonic acid; phloroglucinol; 1-(7 - hydroxy-1-naphthyl)-biguanide; 1,8-naphthalenediol; resorcinol; octylresorcinol; 3-methyl-1-phenylpyrazolone; α-resorcylic acid; H acid; acetoacetanilide; and the like.

The coating solutions may contain the various adjuncts usual in the manufacture of light-sensitive diazotype materials. These include metal salts for intensification of the dyestuff image such as sodium sulfate, zinc sulfate, zinc chloride; stabilizing agents such as thiourea, thiosinamine, naphthalenetrisulfonic acid; acids acting to retard precoupling in two-component systems such as acetic acid, boric acid, tartaric acid; hygroscopic agents such as glycol, glycerin; wetting agents such as saponin, lauryl sulfate, keryl benzene sulfonate, the oleic acid amide of N-methyl taurine, and the like. The preferred pH, particularly for one-component materials, ranges from 3 to 7, since it is within this range that the maximum sensitivity for visible light is observed.

The base to which the coating solution is applied may be any of those previously suggested for employment in the diazotype field. Examples of such bases are high-grade rag paper, cotton, rayon, starch-filled cloth, partially hydrolyzed cellulose triacetate film base, polyethyleneterephthalate, and the like.

The invention will be better understood by reference to the following example, but it is to be understood that the invention is not restricted thereto.

EXAMPLE I

7 - dimethylamino-2-fluorenediazonium chlorozincate was coated on paper from a solution of 0.7 g. of diazo in 100 ml. of water containing 0.25 g. of citric acid. The coating was dried in a steam cabinet for 5–10 minutes and exposed through a stepwedge to radiation from a 100 watt tungsten lamp at distances and exposure times varying from 13 inches and 4 minutes to 5 inches and 1.5 minutes. The exposed paper was developed in a developer of the following constitution:

| | | |
|---|---|---|
| Borax | gms | 40 |
| Sodium carbonate | gms | 30 |
| Thiourea | gms | 20 |
| Phloroglucinol | gms | 8 |
| Resorcinol | gms | 8 |
| Lauryl sulfate | gms | 2 |
| Water | cc | 1000 |

A good non-bleeding image on a clean white background was formed.

A standard moist process paper sensitized with p-amino-N-benzyl-N-ethylbenzenediazonium chlorozincate, coated, exposed, and developed at the same time and in the same way as the above diazotype material failed to give an acceptable copy, the background being nearly as dark as the image area.

EXAMPLE II

A portion of the coated paper prepared as described in Example I from 7-dimethylamino-2-fluorenediazonium chlorozincate was exposed for 5 minutes to a four-fold enlarged image originated from a multicolored 35 mm. original. Development of the exposed paper as in Example I gave a good positive image. This demonstrates utility in copying an enlarged image, whereas diazo compounds derived from p-phenylenediamine cannot be utilized in this manner.

EXAMPLE III

A sample of the coated paper containing 7-dimethylamino-2-fluorenediazonium chlorozincate was exposed beneath a positive color transparency to mercury arc radiation. It was then developed with an aqueous solution containing 2,3-naphthalenediol and sodium carbonate. The copy thus obtained faithfully reproduced in blue monochrome all the objects of the multicolored original.

EXAMPLE IV

| | | |
|---|---|---|
| Water | cc | 70 |
| Ethylene glycol | cc | 5 |
| Alcohol | cc | 2 |
| Citric acid | gr | 5 |
| Thiourea | gr | 5 |
| Zinc chloride | gr | 5 |
| 2,3-dihydroxynaphthalene-6-sulfonic acid | gr | 3 |
| 7-diethylamino-2-fluorene-diazonium chlorozincate | gr | 2 |
| Saponin | gr | .1 |
| Water | cc | 100 |

The sensitizing solution was coated on high-grade paper and dried. The prints made from these coatings had a considerable enhancement in density when compared to prints made with the same composition using the diazo from N,N-diethyl-p-phenylenediamine.

EXAMPLE V

The procedure is the same as in Example IV excepting there was used as the sensitizer 7- morpholino-2-fluorenediazonium chlorozincate.

EXAMPLE VI

The procedure was the same as in Example IV excepting there was used as the sensitizer 7-anilina-2-fluorenediazonium chlorozincate.

EXAMPLE VII

The procedure was the same as in Example IV excepting that the sensitizer used is 7-bis(2-hydroxyethyl)amino-2-fluorenediazonium chlorozincate.

EXAMPLE VIII

The procedure is the same as in Example III excepting that the sensitizer used in 7-bis(2-hydroxyethyl)amino-2-fluorenediazonium chlorozincate.

Modifications of the invention will occur to persons skilled in the art and we do not, therefore, intend to be limited in the patent granted except as necessitated by the appended claims.

What is claimed is:

1. A light-sensitive diazotype material comprising a support and a light-sensitive layer thereon, said light sensitive layer containing as the sensitizer a diazonium salt having sensitivity to visible light wherein said diazonium salt comprises the diazotization product of a primary amino group of the compounds selected from the group consisting of a 7-secondary-amino-2-primary-amino fluorene and a 7-tertiary-amino-2-primary-amino fluorene.

2. A light-sensitive diazotype material as defined in claim 1 wherein a coupling component is present.

3. A light-sensitive diazotype material containing as the sensitizer a diazonium salt having sensitivity to visible light wherein said diazonium salt comprises the diazotization product of a 7 - tertiary-amino-2-primary-aminofluorene.

4. A light-sensitive diazotype material as defined in claim 3 wherein said tertiary amino group is dimethylamino group.

5. A light-sensitive diazotype material as defined in claim 4 wherein said tertiary amino group is a morpholino group.

6. A light-sensitive diazotype material as defined in claim 4 wherein said tertiary amino group is diethylamino group.

References Cited

UNITED STATES PATENTS 2,405,523  8/1946  Sease et al. _____ 96—75

OTHER REFERENCES

Fletcher, "J. Org. Chem.," vol. 23, 1958, pp. 680–683, QD241J6 Spencer, "The Photographic Journal," December 1928, pp. 490–496.

NORMAN G. TORCHIN, *Primary Examiner.*

C. L. BOWERS, *Assistant Examiner.*